Patented Apr. 12, 1938

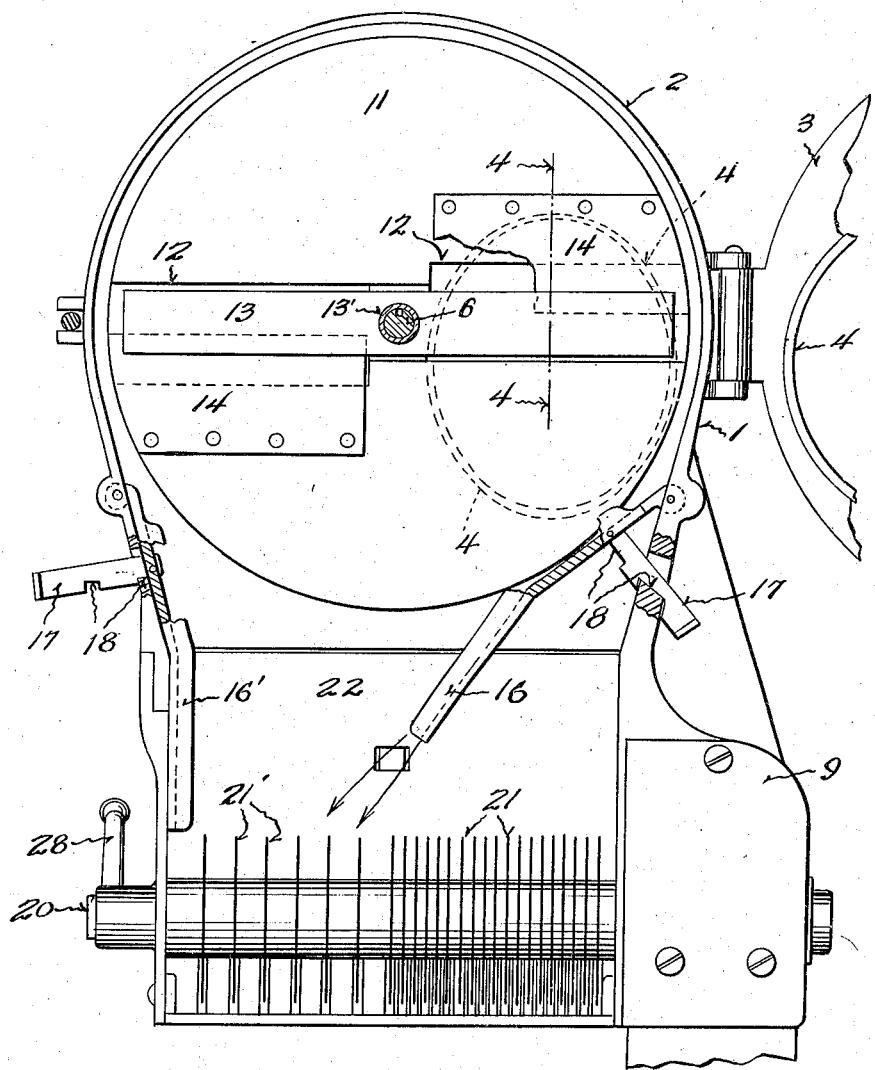

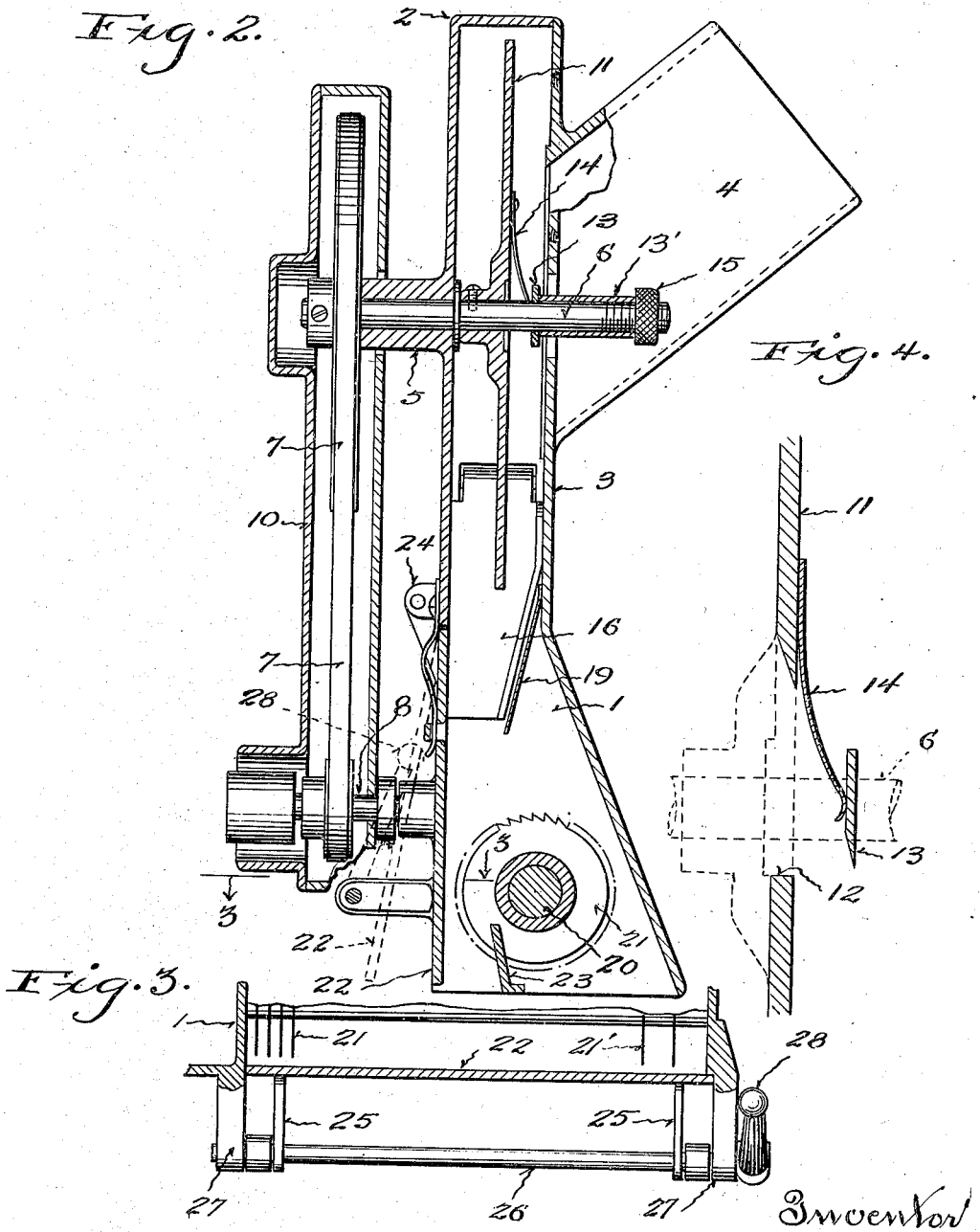

2,114,020

UNITED STATES PATENT OFFICE 2,114,020

MACHINE FOR PREPARING FOOD PRODUCTS

Maynard A. Froney, Racine, Wis., assignor to Froney Electrocut Co., Racine, Wis.

Application January 9, 1937, Serial No. 119,815

1 Claim. (Cl. 146—78)

My invention refers to machines for preparing food products, and it has for its object to provide a simple, economical, and effective power-driven machine, whereby a vegetable, or other substance, may be initially sliced at predetermined thicknesses, and discharged as a finished product, or by simple, manual adjustment the slice may be severed into narrow or wide strips.

With the above and other objects in view, my invention consists in certain peculiarities of construction and combination of parts, as will be hereinafter more fully set forth with reference to the drawings and subsequently claimed.

In the drawings:

Figure 1 represents a face view of a slicing machine having a cover swung open and broken away, with parts in section to more clearly illustrate structural features.

Figure 2 is a sectional elevation of the same, the section being indicated by line 2—2 of Figure 1, Figure 3 is a detail sectional plan view showing the manual feed adjusting means, the section being indicated by the line 3—3 of Figure 2, and Figure 4 is an enlarged fragmentary sectional detail, illustrating the cutting means, the section being indicated by line 4—4 of Figure 1.

Referring by characters to the drawings, I represents a housing having a circular top shell 2, and 3 is a cover plate which is hingedly connected to the circular portion 2, the cover being provided with an angularly disposed feed hopper 4, which is indicated in dotted and full lines in Figure 1, its position being to one side of the center of the housing portion 2. The housing is provided with a bearing 5 for a rotary shaft 6, which shaft is driven by a belt and pulley drive 7 from a motor shaft 8, which receives its power from a motor (not shown) mounted in a jacket 9, constituting part of the frame. This drive forms no part of my invention, and mechanism is protected by a shell 10, which is spaced from and carried by the housing 1.

Secured to the shaft 6 is a cutting disc 11 provided with radial discharge openings 12, through which the product is delivered after the same is sliced. Alined with the radial discharge opening is a double-acting blade 13, which blade is provided with a hub 13' that is splined to the shaft 6, and said hub extends outwardly through an opening in the cover plate, as best shown in Figure 2. Spring plates 14 are secured to the disc 11, and their free ends impinge against the back faces of the knife 13, whereby said knife is urged away from the disc to effect adjustment of the same. A knurled adjusting screw 15 is in threaded union with the shaft 6, and when said screw is rotated inwardly in engagement with the end of the hub 13', the knife will be adjusted more or less closely to the face of the disc 11 in opposition to the springs, whereby the thickness of the material to be cut is controlled.

Pivoted to the side walls of the housing is a pair of chutes 16—16', said chutes being below the disc 11 and normally having their discharge points inclined toward the axis of the disc. Each chute has pivoted thereto a locking dog 17, which dogs project through slots in the housing and are notched on their lower faces at 18 for selected engagement with one of the slot walls.

As shown in Figure 1, the lefthand chute 16' is locked to the inner face of the housing, and the chute 16 at the right is manually adjusted to function as a feeder, due to the fact that the dog 17 has been pushed inwardly and locked in the associated notch 18. As shown in Figure 2 of the drawings, the cover plate carries an angularly disposed sheet 19 which serves as a guide for deflecting the cut product which is discharged from either chute.

Mounted in the housing below the chute is a shaft 20, which shaft is driven by the motor (not shown), and said shaft carries a closely nested set of toothed cutting discs 21, and a coarsely spaced set of cutting discs 21', whereby the product, which has been previously sliced, may be cut into coarse or fine strips or lengths. As shown in Figure 1 of the drawings, the trough 16 is set to discharge cut slices to the gang of coarsely set discs 21', whereby the width of the strip is proportionately controlled.

When the product is severed into strips by the gang of discs, they are discharged against an adjusted valve member 22, and the guide fin 23, it being understood that this valve member serves to deflect the material to be cut against the gang of cutting discs 21 or 21'. The valve plate 22 is hingedly connected to the rear wall of the housing, as indicated at 24, there being a leaf spring associated with the hinge connection, which impinges against the valve plate, whereby it is yieldingly forced away from the gangs of cutting discs.

As best shown in Figures 2 and 3 of the drawings, the valve plate is opposed by spring urge through arms 25 secured to a rock shaft 26, the same being mounted in bearings 27 that project from the housing. An adjusting arm 28 is carried at one end of the shaft, whereby the arms 25 are locked in a position to release the valve plate 22 from its working position shown in full lines in Figure 2, to a dotted position shown in said view.

From the foregoing description it will be observed that all food products, such for example as potatoes, carrots, beets, or the like, when fed through the hopper to the disc, will be sliced into predetermined thicknesses, and as these slices drop by gravity, they are deflected to the coarsely spaced set of cutting discs 21', whereby said slice is severed into strips.

If it is desired to produce from the strip what may be termed shoe-strings, by manual control the chute 16 is withdrawn from its functioning position, and the disc 16' is adjusted to its working position, whereby the sliced material is thrown or deflected upon the closely nested gang of cutting discs 21, it being understood that the valve plate in its functioning position, as shown in Figure 2, will hold the slice against the cutting gang of discs as it travels downwardly and is discharged through the narrow throat. Should it be desired simply to discharge the slice of material without cutting them into strips, obviously the mechanism controlling the valve 22 is shifted, whereby the arms 25 will be free to permit the spring-controlled valve member to function and open the throat, as indicated in dotted lines, Figure 1. Thus, the sliced material will be discharged without further cutting.

While I have shown and described one specific arrangement of my invention, it is understood that I may vary the structural features of the same within the scope of the claim.

I claim:

A cutting apparatus for food products comprising a housing, a cutting disc rotatably mounted therein provided with a radially disposed knife, chutes hingedly connected to the housing below the disc, means for manually and selectively adjusting the chutes into working position, means for locking said chutes in their working or idle positions, a gang of coarsely nested knives mounted in position below the chutes, a valve member associated with the gang of knives in pivotal union with the housing, a spring for urging the valve away from the faces of the gangs of cutting discs, and a rock shaft having arms for selectively locking or freeing the valve from its cutting position with relation to the gangs of knives.

MAYNARD A. FRONEY.